(12) United States Patent
Page (10) Patent No.: US 9,551,279 B2
(45) Date of Patent: Jan. 24, 2017

(54) CAES PLANT USING STEAM INJECTION AND BOTTOMING CYCLE EXPANDER

(71) Applicant: Ian M. Page, Hillsborough, NY (US)

(72) Inventor: Ian M. Page, Hillsborough, NY (US)

(73) Assignee: Dresser-Rand Company, Olean, NY (US)

(*) Notice: Subject to any disclaimer, the term of this patent is extended or adjusted under 35 U.S.C. 154(b) by 0 days.

(21) Appl. No.: 14/202,043

(22) Filed: Mar. 10, 2014

(65) Prior Publication Data

US 2016/0053682 A1    Feb. 25, 2016

Related U.S. Application Data

(60) Provisional application No. 61/782,695, filed on Mar. 14, 2013.

(51) Int. Cl.

| | | |
|---|---|---|
| *F02C 6/16* | (2006.01) | |
| *F01K 21/04* | (2006.01) | |
| *F02C 6/18* | (2006.01) | |
| *F02C 1/05* | (2006.01) | |
| *F02C 3/30* | (2006.01) | |

(52) U.S. Cl.
CPC ........... *F02C 6/16* (2013.01); *F01K 21/047* (2013.01); *F02C 1/05* (2013.01); *F02C 3/30* (2013.01); *F02C 6/18* (2013.01); *F05D 2220/31* (2013.01); *F05D 2220/32* (2013.01); *Y02E 60/15* (2013.01)

(58) Field of Classification Search
CPC ............... F02C 6/18; F02C 3/30; F02C 1/05; F02C 6/16; F01K 23/10; F01K 21/047; Y02E 60/15; F05D 2220/31; F05D 2220/32
See application file for complete search history.

(56) References Cited

U.S. PATENT DOCUMENTS

| 4,281,256 | A  | * | 7/1981 | Ahrens ...................... F02C 6/16 |
|---|---|---|---|---|
| | | | | 290/1 R |
| 5,181,376 | A | * | 1/1993 | Rao ........................ F01K 21/047 |
| | | | | 60/39.182 |
| 7,669,423 | B2 | * | 3/2010 | Nakhamkin .............. F02C 6/16 |
| | | | | 60/727 |
| 2012/0036853 | A1 | * | 2/2012 | Kidd .......................... F02C 1/04 |
| | | | | 60/659 |
| 2015/0184590 | A1 | * | 7/2015 | Conlon .................... F02C 6/16 |
| | | | | 60/772 |

\* cited by examiner

*Primary Examiner* — Jacob Cigna (57) ABSTRACT

A system and method are provided for a compressed air energy storage (CAES) system. The system and method may include compressing a process gas with a compressor train to produce a compressed process gas. The compressed process gas may be directed to a compressed gas storage unit and stored therein. The compressed process gas from the compressed gas storage unit may be released to a heat recovery unit via a feed line. The heat recovery unit may heat the compressed process gas and direct the heated compressed process gas to an expansion assembly to generate a power output. Feed water from a feed water source may be heated in the heat recovery unit to produce steam for injection into a combustion turbine assembly. The combustion turbine assembly may heat the heat recovery unit via an exhaust line.

13 Claims, 4 Drawing Sheets

CAES PLANT USING STEAM INJECTION AND BOTTOMING CYCLE EXPANDER

CROSS-REFERENCE TO RELATED APPLICATIONS

This application claims priority to U.S. Provisional Patent Application having Ser. No. 61/782,695, which was filed Mar. 14, 2013. This priority application is hereby incorporated by reference in its entirety into the present application to the extent consistent with the present application.

BACKGROUND

Figure 1:
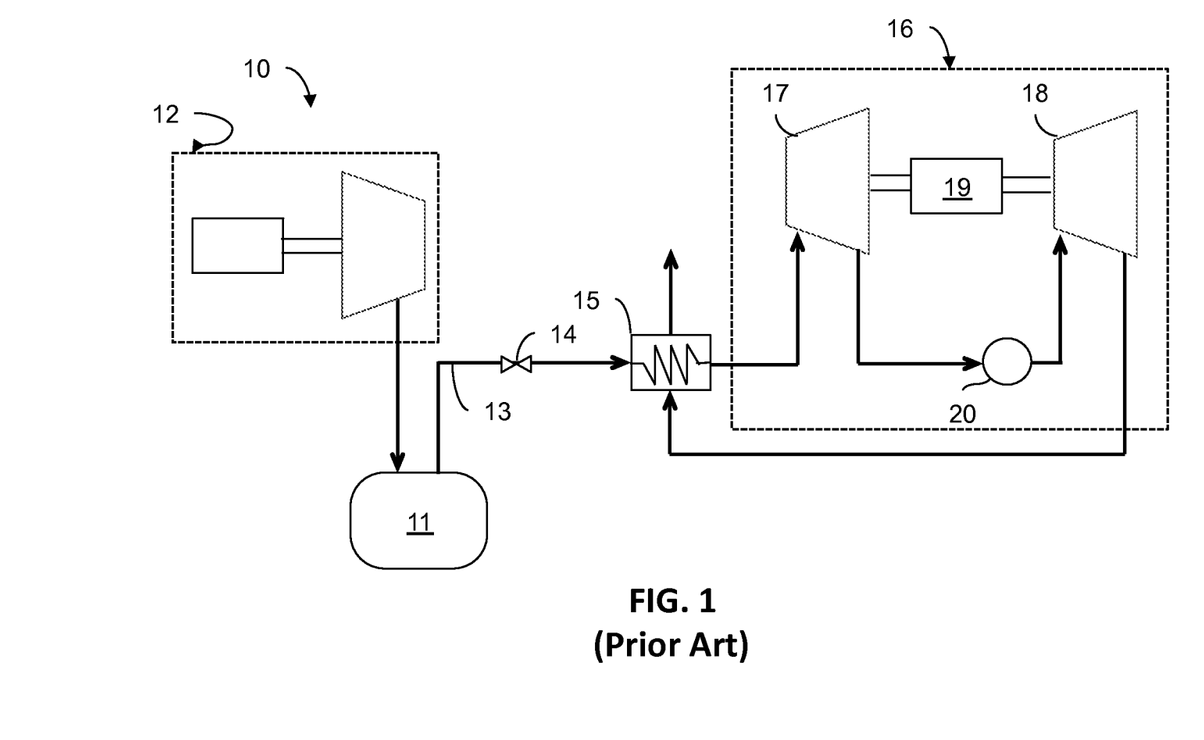
- FIG. 1 illustrates a schematic of a conventional CAES system, according to the prior art.

A conventional CAES system 10, illustrated in FIG. 1, may include a gas storage unit 11 configured to store a process gas, such as ambient air, compressed by a compressor train 12. A feed line 13 may direct the compressed process gas from the gas storage unit 11 to a throttling device, such as a valve assembly 14, which may reduce the pressure of the compressed process gas. The feed line 13 may also direct the compressed process gas to a heat exchanger or recuperator 15, where the compressed process gas may be preheated, before being directed to an expansion assembly 16. The expansion assembly 16 may include an unfired expander or air expander 17, a fired expander 18, and a generator 19. The compressed process gas may be expanded in the air expander 17 to a reduced pressure. The expanded process gas may then be directed to a combustor 20 coupled to the fired expander 18, where the expanded process gas may be mixed with a fuel and burned before subsequent expansion in the fired expander 18. The expansion of the process gas in the air expander 17 and the fired expander 18 may drive the generator 19 to produce a power output. Exhaust gases from the fired expander 18 of the expansion assembly 16 may be pass through the recuperator 15 to preheat the compressed process gas from the gas storage unit 11.

The gas storage unit 11 of the conventional CAES system 10 may often include a cavern with sufficient volume or storage capacity to store the compressed process gas during off-peak hours. However, in many regions, geological constraints, such as a limited underground storage capacity or a lack thereof, may be imposed on the implementation of the CAES systems. In these scenarios, where the storage of the compressed process gas is limited or nonexistent, the amount of process gas utilized by the expanders 17, 18 to generate a power output, or specific air consumption, may be a critical factor in determining the overall efficiency and/or cost of implementing and/or operating the CAES system 10.

In view of the foregoing, above-ground storage devices are often utilized to store the compressed process gas during off-peak hours and overcome the geological limitations. Some conventional above-ground storage devices, however, may not provide suitable storage capacities, and other above-ground storage devices having suitable storage capacities may be cost-prohibitive.

What is needed, then, is a CAES system and method of operating thereof, capable of reducing the specific air consumption to increase efficiencies and costs of operating the CAES system.

SUMMARY

Embodiments of the disclosure may provide a method for operating a compressed air energy storage system. The method for operating the compressed air energy storage system may include compressing a process gas with a compressor train to produce a compressed process gas. The compressed process gas may be directed to a compressed gas storage unit and stored therein. The method may also include releasing the compressed process gas from the compressed gas storage unit to a heat recovery unit via a feed line. The compressed process gas in the heat recovery unit may be heated and the heated compressed process gas may be directed to an expansion assembly to generate a power output. The method may also include feeding feed water from a feed water source to the heat recovery unit and heating the feed water to produce steam. The steam from the heat recovery unit may be introduced to a combustion turbine assembly. The method may further include heating the heat recovery unit with the combustion turbine assembly via an exhaust line.

Embodiments of the disclosure may further provide a method for reducing specific air consumption in a compressed air energy storage system. The method may include compressing a process gas with a compressor train to produce a compressed process gas. The compressed process gas may be directed to a compressed gas storage unit and stored therein. The compressed process gas may be released from the compressed gas storage unit to a heat recovery unit via a feed line. The compressed process gas in the heat recovery unit may be heated and directed to an expansion assembly to generate a first power output. The method may also include feeding feed water from a feed water source to the heat recovery unit and heating the feed water to produce steam. A second process gas may be compressed in a compressor of a combustion turbine assembly. The compressed second process gas may be directed to a combustor. The combustor may combust the compressed second process gas and a fuel to provide a combustion product. The combustion product may be expanded in a turbine of the combustion turbine assembly to provide an exhaust product and a second power output. The exhaust product may be directed to the heat recovery unit to heat the heat recovery unit. The steam from the heat recovery unit may be introduced to the combustion turbine assembly to reduce the specific air consumption in the compressed air energy storage system.

Embodiments of the disclosure may further provide a compressed air energy storage system. The compressed air energy storage system may include a compressor train configured to receive a process gas and output a compressed process gas. A compressed gas storage unit may be fluidly coupled with the compressor train and may be configured to receive, store, and output the compressed process gas. The compressed air energy storage system may also include a heat recovery unit fluidly coupled with the compressed gas storage unit via a feed line. The heat recovery unit may be configured to receive the compressed process gas from the compressed gas storage unit and heat the compressed process gas. The heat recovery unit may also be configured to receive feed water from a feed water source and heat the feed water to provide steam. A combustion turbine assembly may be fluidly coupled with the heat recovery unit. The combustion turbine assembly may be configured to receive the steam from the heat recovery unit and deliver heat to the heat recovery unit via an exhaust line. An expansion assembly may be fluidly coupled with the heat recovery unit and configured to receive the heated compressed process gas from the heat recovery unit and generate a power output.

BRIEF DESCRIPTION OF THE DRAWINGS

The present disclosure is best understood from the following detailed description when read with the accompany

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
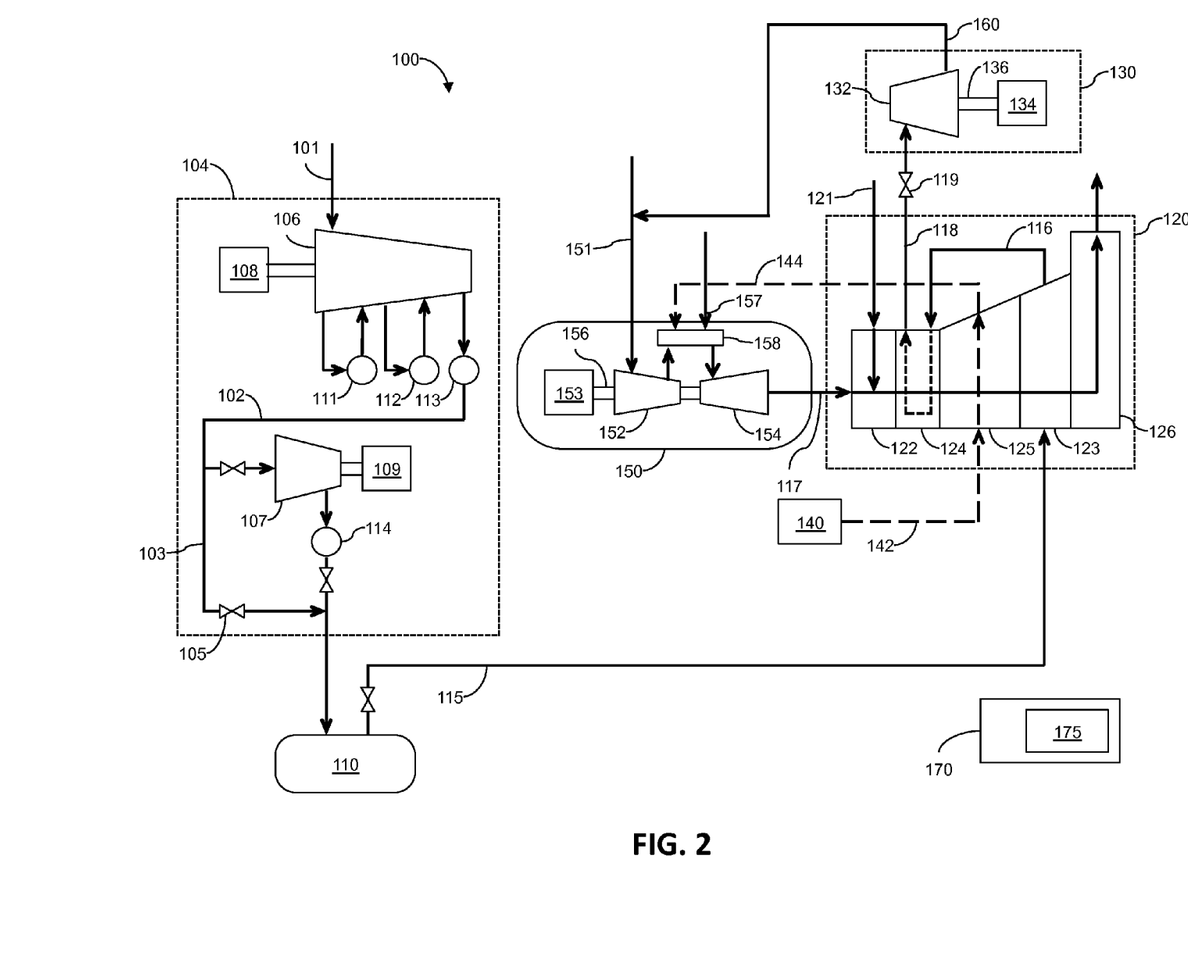
FIG. 2 illustrates an exemplary CAES system including a steam production cycle, accordingly to one or more embodiments disclosed herein.

FIG. 2 illustrates an exemplary CAES system 100 including a steam production cycle, accordingly to one or more embodiments disclosed. The CAES system 100 may include a compressor train 104 including one or more compressors (two are shown 106, 107) configured to compress a process gas. The process gas may include, but is not limited to, ambient air, carbon dioxide, water or steam, nitrogen, oxygen, or any combination or mixture thereof. Illustrative compressors 106, 107 may include, but are not limited to, supersonic compressors, centrifugal compressors, axial flow compressors, reciprocating compressors, rotating screw compressors, rotary vane compressors, scroll compressors, diaphragm compressors, or any combination thereof. In at least one embodiment, one or more of the compressors 106, 107 may be a boost or auxiliary compressor. In another embodiment, one or more of the compressors 106, 107 may include RAMPRESSOR® compressors developed by Ramgen Power Systems, LLC of Bellevue, Wash.

The compressor train 104 may also include one or more drivers or motors (two are shown 108, 109) coupled with and configured to drive the compressors 106, 107 of the compressor train 104. For example, as illustrated in FIG. 2, a first driver 108 may be coupled with a first compressor 106 and a second driver 109 may be coupled with a second compressor 107. The drivers 108, 109 may include, but are not limited to, electric motors, turbines, and/or any other device capable of driving the compressors 106, 107. The compressors 106, 107 and/or the drivers 108, 109 may be disposed together or separately in a hermetically sealed casing (not shown). For example, the first compressor 106 and the first driver 108 may include a DATUM® centrifugal compressor unit commercially available from Dresser-Rand of Olean, N.Y.

The CAES system 100 may further include one or more coolers 111, 112, 113, 114 coupled with the compressors 106, 107 and configured to absorb or remove heat generated from the compression of the process gas. The coolers 111, 112, 113, 114 coupled with the compressors 106, 107 may be aftercoolers and/or intercoolers. In at least one embodiment, one or more of the compressors 106, 107 may include one or more compressor stages (not shown) having one or more of the coolers 111, 112, 113, 114 interposed therebetween. For example, as illustrated in FIG. 2, the first compressor 106 of the compressor train 104 may include a plurality of compressor stages (not shown) having intercoolers 111, 112 interposed between the compressor stages. The compressor train 104 may also include aftercoolers 113, 114 disposed downstream from each of the compressors 106, 107, respectively.

In at least one embodiment, the coolers 111, 112, 113, 114 may include a coil system, a shell-and-tube system, a direct contact system, or any other heat transfer system known in the art. A heat transfer medium may flow through the coolers 111, 112, 113, 114 to absorb the heat generated from the compression of the process gas. Accordingly, the heat transfer medium may have a higher temperature when it exits the coolers 111, 112, 113, 114 than when it enters the coolers 111, 112, 113, 114 (e.g., the heat transfer medium may be heated, and the compressed process gas may have a lower temperature when it exits the coolers 111, 112, 113, 114 than when it enters the coolers 111, 112, 113, 114. The heat transfer medium may be water, steam, a refrigerant, a process gas, such as carbon dioxide or propane, a combination thereof, or any other suitable heat transfer medium. In at least one embodiment, the coolers 111, 112, 113, 114 may provide supplemental heating to one or more systems and/or assemblies of the CAES system 110. For example, the coolers 111, 112, 113, 114 may provide supplemental heating to a heat recovery unit 120, further described herein. Such an embodiment is described in pending U.S. patent application Ser. No. 13/050,781, filed on Mar. 17, 2011, and published as U.S. Pub. No. 2012/0036853, the contents of which are hereby incorporated by reference to the extent consistent with the present disclosure.

In at least one embodiment, the coolers 111, 112, 113, 114 may be fluidly coupled with one or more thermal energy storage devices (TES) (not shown). The heat transfer medium from the coolers 111, 112, 113, 114 may be directed to the thermal energy storage device and the thermal energy storage device may absorb and store the heat from the heat transfer medium. Accordingly, the coolers 111, 112, 113, 114, the heat transfer medium, and/or the thermal energy storage device may be configured to absorb the heat generated from the compression of the process gas and store the heat of compression from the compressor train 104. The heat of compression stored in the thermal storage device may be utilized in one or more systems and/or assemblies of the CAES system 100, as further described herein.

During off-peak hours, the process gas may be introduced to the compressor train 104 via line 101. The compressor train 104 may compress the process gas introduced thereto via the first compressor 106 and deliver the compressed process gas through line 102 to the second compressor 107 for further compression. In at least one embodiment, as illustrated in FIG. 2, the compressor train 104 may include a bypass line 103 coupled with line 102 upstream of the second compressor 107 and downstream from the second compressor 107, and configured to direct the compressed process gas from the first compressor 106 around the second compressor 107. A bypass valve 105 may be coupled with the bypass line 103 and may be configured to control the flow of the compressed process gas therethrough.

The compressed process gas from the first compressor 106 and/or the second compressor 107 may be delivered to a compressed gas storage unit 110 and may be stored therein. The compressed gas storage unit 110 may be or include any suitable device, vessel, and/or geological formation capable of storing the compressed process gas. Illustrative compressed gas storage units 110 may include, but are not limited to, one or more rock caverns, salt caverns, aquifers, abandoned mines, depleted gas fields, or any combination thereof. The compressed gas storage units 110 may also include, but are not limited to, one or more above ground vessels, underground vessels, underwater vessels, or any combination thereof.

A heat recovery unit 120 may be fluidly coupled with the compressed gas storage unit 110 via a feed line 115. The heat recovery unit 120 may be fluidly coupled with and/or in thermal communication with a combustion turbine assembly 150. In at least one embodiment, the combustion turbine assembly 150 may be configured to supply heat or thermal energy to the heat recovery unit 120. The combustion turbine assembly 150 may include a compressor 152, a driver or motor 153, a generator (not shown), and a turbine 154 coupled with one another via a rotary shaft 156. The motor 153 may be configured to drive the compressor 152. The motor 153 may be any of the motors 108, 109 described with respect to the compressor train 104. For example, the motor 153 may be an electric motor, turbine, or any other device capable of driving the compressor 152. The compressor 152 may be configured to compress the process gas introduced thereto via line 151 and direct the compressed process gas to a combustor 158 fluidly coupled therewith.

The combustor 158 may be fluidly coupled with the compressor 152, the turbine 154, and the heat recovery unit 120. The combustor 158 may receive the compressed process gas from the compressor 152 and fuel from a fuel supply line 157. In at least one embodiment, the fuel and the compressed process gas may be introduced to the combustor 158 as a mixture. In another embodiment, the fuel and the compressed process gas may be introduced to the combustor 158 independently and may combine in the combustor 158 to provide the mixture. The combustor 158 may be configured to receive the fuel and the compressed process gas and subsequently combust or burn the mixture to provide a combustion product. In at least one embodiment, steam from the heat recovery unit 120 may also be injected into the combustor 158, as further described herein. The combustor 158 may direct the combustion product to the turbine 154 coupled therewith. The combustion product may be expanded in the turbine 154 to provide an exhaust product. The expansion of the combustion product in the turbine 154 may drive the generator (not shown) to produce a power output. The exhaust product may be vented to the atmosphere or directed to the heat recovery unit 120. For example, as illustrated in FIG. 2, the exhaust product may be directed into the heat recovery unit 120 via exhaust line 117, thereby supplying the heat recovery unit 120 with thermal energy.

The heat recovery unit 120 may include a duct burner 122 and one or more heat recovery sections coupled with and in thermal communication with the exhaust line 117. The one or more heat recovery sections may include, but are not limited to, a first and second recuperator or recuperator section 123, 124, a heat recovery steam generator 125, a stack 126, or any combination thereof. In at least one embodiment, the heat recovery unit 120 may be a single-body assembly including the duct burner 122, the first and second recuperators 123, 124, the heat recovery steam generator 125, and the stack 126, coupled with one another. In another embodiment, the duct burner 122, the first and second recuperators 123, 124, the heat recovery steam generator 125, or any combination thereof, may be stand-alone assemblies. The heat recovery unit 120 may be configured to heat the compressed processed gas from the compressed gas storage unit 110 via a process gas heating cycle, as further described herein. The heat recovery unit 120 may also be configured to provide steam or water vapor for injection into the combustor 158 of the combustion turbine assembly 150 via a steam production cycle, as further described herein. In at least one embodiment, the process gas heating cycle and the steam production cycle may not directly interact with one another. For example, the steam or water vapor provided by the steam production cycle may not combine or mix with the compressed process gas from the compressed gas storage unit 110.

As illustrated in FIG. 2, the first and second recuperators or recuperator sections 123, 124 may be coupled with and in thermal communication with the exhaust line 117 downstream from the duct burner 122. The heat recovery steam generator 125 may be coupled with and in thermal communication with the exhaust line 117 between the first and second recuperators or recuperator sections 123, 124. The stack 126 may be coupled with and in thermal communication with the exhaust line 117 downstream from the first recuperator 123. While the CAES system 100 illustrated in FIG. 2 may show a particular configuration for the heat recovery unit 120, other orientations or dispositions of the heat recovery sections (e.g., the recuperators 123, 124, the heat recovery steam generator 125, and the stack 126) are contemplated. For example, the recuperators 123, 124 may be coupled and disposed with the exhaust line 117 adjacent one another. In another example, the heat recovery steam generator 125 may be coupled with the exhaust line 117 either upstream of or downstream from the recuperators 123, 124.

The duct burner 122 may be configured to receive the exhaust product from the combustion turbine assembly 150 via the exhaust line 117 and direct the exhaust product to the first recuperator 123. The duct burner 122 may also be configured to receive heat or thermal energy from a heat source (now shown) via line 121 and combine or transfer the thermal energy to the exhaust product flowing therethrough, thereby incrementally increasing the temperature of the exhaust product from the combustion turbine assembly 150. In at least one embodiment, the heat source may be the thermal storage device, and the thermal energy from the heat source may be the heat of compression from the compression of the process gas in the compressor train 104. In another embodiment, the heat source may be provided directly from the heat transfer medium flowing through the coolers 111, 112, 113, 114. For example, the coolers 111, 112, 113, 114 may be thermally coupled with the duct burner 122 and may be configured to transfer the heat of compression to the duct burner 122 to supply heat to the heat recovery unit 120. In another embodiment, the duct burner 122 may be omitted from the heat recovery unit 120 and heat provided by the duct burner 122 may be substituted or replaced with heat absorbed by the coolers 111, 112, 113, 114. Accordingly, providing the heat of compression from the compressor train 104 to the heat recovery unit 120 may provide supplemental heat thereto, thereby reducing fuel requirements for the duct burner 122. Providing the heat of compression from the compressor train 104 to the heat recovery unit 120 may also allow the heat recovery unit 120 to be operated without the duct burner 122.

As previously described, the first and second recuperators or recuperator sections 123, 124 may be coupled with and in thermal communication with the exhaust line 117 downstream from the duct burner 122. The first and second recuperators 123, 124 may be configured to receive the exhaust product from the duct burner 122 via the exhaust line 117. The first and second recuperators 123, 124 may also be coupled with and in thermal communication with the feed line 115 and may be configured to transfer heat or thermal energy from the exhaust product to the compressed process gas from the compressed gas storage unit 110. For example, the first recuperator 123 may be fluidly coupled with the feed line 115 and may be configured to receive and preheat the compressed process gas from the compressed gas storage unit 110 and direct the preheated compressed process gas to the second recuperator 124 via line 116. The second recuperator 124 may be configured to receive the preheated compressed process gas from the first recuperator 123, further heat the preheated compressed process gas, and direct the heated compressed process gas to an expansion assembly 130 via line 118.

As illustrated in FIG. 2, the expansion assembly 130 may include a turbine 132 and a generator 134 coupled with one another via a rotary shaft 136. In at least one embodiment, the turbine 132 of the expansion assembly 130 may include one or more turbine assemblies (not shown) coupled with one or more generators via one or more rotary shafts. For example, the turbine 132 may include an air turbine assembly (not shown) and/or a gas turbine assembly (not shown) coupled to one or more rotary shafts (not shown). The air turbine assembly and a first generator may be coupled with one another via a first rotary shaft, and the gas turbine assembly and a second generator may be coupled with one another via a second rotary shaft, thereby separating the power generated from the air turbine assembly and the gas turbine assembly.

The turbine 132 may be configured to receive the heated compressed process gas from the heat recovery unit 120 via line 118 and expand the heated compressed process gas to provide mechanical energy to drive the generator 134. Illustrative turbines 132 may include, but are not limited to, an expansion device, a geroler, a gerotor, a valve, a pressure swing, or any other device capable of transforming a pressure or pressure/enthalpy drop in the compressed process gas into mechanical energy. The generator 134 may be driven by the turbine 132 to generate a power output and supply the power output to an electrical grid (not shown).

A flow control valve 119 may be coupled with line 118 and may be configured to control a mass flow of the heated compressed process gas directed to the expansion assembly 130. In at least one embodiment, the flow control valve 119 may control the mass flow of the heated compressed process gas such that the pressure thereof is at or near a designed inlet pressure of the turbine 132. Providing a pressure or mass flow of the compressed process gas to the turbine 132 at or near the designed inlet pressure or mass flow rate may increase efficiency and power generation in the CAES system 100.

In at least one embodiment, the turbine 132 may include one or more turbine stages and an inlet or injection point (not shown) corresponding to each of the one or more stages. Each of the inlets may be fluidly coupled to line 118 through one or more lines (not shown). The one or more lines (not shown) may further include one or more valves (not shown) configured to control a mass flow of the compressed process gas therethrough. In at least one embodiment, the one or more valves may be actuated to allow the compressed process gas to expand through the entire turbine 132, thereby utilizing all the stages thereof. In another embodiment, the valves may be actuated to allow the compressed process gas to expand through a portion of the turbine 132, thereby circumventing one or more stages of the turbine 132. The arrangement of the valves may be determined by the pressure of the compressed process gas in line 118 upstream of the expansion assembly 130.

The expansion assembly 130 may receive the compressed process gas over a broad pressure range. For example, the expansion assembly 130 may receive the compressed process gas at a pressure from a low of about 3.4 megapascals (MPa) (500 psia), about 4.1 MPa (600 psia), or about 4.8 MPa (700 psia) to a high of about 5.5 MPa (800 psia), about 6.2 MPa (900 psia), about 6.9 MPa (1000 psia), or greater. In another example, the expansion assembly 130 may receive the compressed process gas at a pressure from about 3.4 MPa (500 psia) to about 6.9 MPa (1000 psia), about 4.1 MPa (600 psia) to about 6.2 MPa (900 psia), or about 4.8 MPa (700 psia) to about 5.5 MPa (800 psia).

In at least one embodiment, the turbine 132 of the expansion assembly 130 may expand the heated compressed process gas and exhaust the expanded process gas to the atmosphere. In another embodiment, the turbine 132 may expand the heated compressed process gas and exhaust the expanded process gas to another system or assembly of the CAES system 100. For example, as illustrated in FIG. 2, an exhaust line 160 may extend from the turbine 132 of the expansion assembly 130 to line 151 of the combustion turbine assembly 150. The exhaust line 160 may be configured to direct the expanded process gas from the turbine 132 to line 151 of the combustion turbine assembly 150 to cool the process gas contained therein. The expanded process gas introduced into the compressor 152 may provide supplemental cooling to the compressor 152 to reduce the specific air consumption of the CAES system 100. In at least one embodiment, the expanded process gas introduced into the compressor 152 via the exhaust line 160 may have a temperature lower than the temperature of the process gas introduced to the compressor 152 via line 151. For example, the temperature of the expanded process gas introduced into the compressor 152 via the exhaust line 160 may have a temperature from a low of about −12° C. (10° F.), about −6.7° C. (20° F.), or about −1.1° C. (30° F.) to a high of about 4.4° C. (40° F.), about 10° C. (50° F.), or about 15.6° C. (60° F.). The temperature of the process gas introduced to the compressor 152 may have a temperature from a low of about 21° C. (70° F.), about 26.7° C. (80° F.), or about 29.4° C. (85° F.) to a high of about 35° C. (95° F.), about 37.8° C. (100° F.), or about 43.3° C. (110° F.).

As previously discussed, the heat recovery unit 120 may be configured to provide steam or water vapor for injection into the combustor 158 of the combustion turbine assembly 150 via a steam production cycle. The production of steam may be provided by the heat recovery steam generator 125 of the heat recovery unit 120. The heat recovery steam generator 125 may be coupled with and in thermal communication with the second recuperator 124 and/or the duct burner 122 via the exhaust line 117 and may be configured to receive the exhaust product from the second recuperator 124 and/or the duct burner 122. The heat recovery steam generator 125 may also be coupled with and in thermal communication with line 142 and may be configured to receive feed water from a water source 140 via line 142. The heat recovery steam generator 125 may be configured to transfer heat or thermal energy from the exhaust product from the second recuperator 124 and/or the duct burner 122 to the feed water from line 142, thereby heating the feed water to produce steam. In at least one embodiment, the amount of heat transferred to the feed water may be sufficient to produce superheated steam.

The steam from the heat recovery steam generator 125 may be directed or introduced into the combustion turbine assembly 150 via line 144. In at least one embodiment, as illustrated in FIG. 2, the steam may be introduced directly to the combustor 158 of the combustion turbine assembly 150 via line 144, and may be mixed with the compressed process gas from the compressor 152 and/or the fuel from line 157. In another embodiment, the steam may be introduced into the combustion turbine assembly 150 upstream of the combustor 158. For example, the steam may be introduced or mixed with the compressed process gas from the compressor 152 upstream of the combustor 158.

The introduction of the steam may reduce the production of emissions in the CAES system 100. For example, the steam may serve to reduce the generation of nitrogen oxides (NOx) in the CAES system 100 and/or reduce the emission of NOx to the atmosphere. The steam may increase the amount of heat or thermal energy generated in the combustion turbine assembly 150, thereby increasing the temperature of the exhaust product directed to the heat recovery unit 120 via the exhaust line 117. The increased temperature of the exhaust product may increase the steam generation in the heat recovery steam generator 125. The introduction of the steam may also increase the capacity of power generated in the combustion turbine assembly 150. For example, the introduction of steam may increase the mass flow through the turbine 154 of the combustion turbine assembly 150. The steam may act as a fluid or power-producing fluid to supplement at least a portion of the compressed process gas provided by the compressor 152. Supplementing at least a portion of the compressed process gas from the compressor 152 may reduce the specific air consumption of the turbine 154, thereby increasing the overall efficiency and capacity of power generated in the CAES system 100. Utilizing steam injection may also reduce the overall cost of operating the CAES system 100. For example, storing and/or pressurizing water may be more economical and less cost-prohibitive than storing the compressed process gas.

A control system 170 may be operatively coupled with the CAES system 100 to monitor and/or control one or more components, systems, assemblies, and/or operating parameters thereof. In at least one embodiment, the control system 170 may include the following features, functions, and operations: automated unmanned operation under a dedicated control system; local and remote human machine interfacing capabilities for data access, data acquisition, unit health monitoring and operation; controlled start-up, operation, and shutdown in the case of a failure event; fully automated start/stop, alarm, shut-down, process adjustment, ambient temperature adjustment, data acquisition and synchronization; control and power management system designed for interfacing with an external distributed plant control system.

The control system 170 may be communicably coupled with the compressor train 104, the compressed gas storage unit 110, the heat recovery unit 120, the expansion assembly 130, the combustion turbine assembly 150, and/or components thereof. The control system 170 may be communicably coupled via any suitable means including but not limited to wired connections and/or wireless connections. In one or more embodiments, the control system 170 may be configured to actuate, adjust, manipulate, and/or otherwise control one or more parts of the CAES system 100. The control system 170 may also be configured to monitor one or more parameters and/or variables of the compressed process gas within the CAES system 100 including, but not limited to, pressure, temperature, and/or mass flow.

In one or more embodiments, the control system 170 may include a computer system 175 with a multi-controller algorithm configured to monitor, actuate, adjust, manipulate, and/or otherwise control one or more assemblies of the CAES system 100 and/or components thereof. The computer system 175 may also be configured to implement one or more methods or processes for the CAES system 100 including, but not limited to, a speed/frequency control mode, a load control mode, a compressor train mode, a startup, a synchronization mode, or any combination thereof.

In at least one embodiment, the CAES system 100 disclosed herein may be provided by modifying one or more parts and/or assemblies of an existing CAES plant or other power generation plant. For example, an existing plant may include a system having a combustion turbine assembly and a heat recovery steam generator. The plant may be modified by supplementing the system with the duct burner 122 and/or the recuperators or recuperator sections 123, 124. For example, the heat recovery steam generator may be modified to provide more space in the heat recovery unit for the duct burner 122 and/or the recuperators or recuperator sections 123, 124. Modifying the heat recovery steam generator of existing plants may provide a cost effective method of providing the CAES system 100 disclosed herein by utilizing one or more existing parts and/or assemblies of the existing plant. In another embodiment, the duct burner 122 and/or the recuperators or recuperator sections 123, 124 may be provided as separate stand-alone components to existing plants to provide the CAES system 100 disclosed herein.

In operation, a process gas may be introduced to the first compressor 106 of the compressor train 104 via line 101. In at least one embodiment, the process gas in line 101 may have a pressure between about 69 kPa (10 psia) and about 137 kPa (20 psia), a temperature between about 4.4° C. (40° F.) and about 43.3° C. (110° F.), and a flow rate between about 4.5 kg/s (10 lbs/sec) and about 45.4 kg/s (100 lbs/sec). For example, the process gas in line 101 may have a pressure of about 96 kPa (14 psia), a temperature of about 23.9° C. (75° F.), and a flow rate of about 11.8 kg/s (26 lbs/sec). The first compressor 106 may compress the process gas and direct the compressed process gas to line 102. The coolers 111, 112, 113 may absorb at least a portion of the heat of compression generated from the compression of the process gas. The compressed process gas may be further compressed in the second compressor 107 and may be further cooled by the cooler 114 before being directed to the compressed gas storage unit 110. Alternatively, the bypass valve 105 may be actuated to circumvent the second compressor 107 and direct the compressed process gas from the first compressor 106 directly to the compressed gas storage unit 110 via line 103.

The compressed process gas may be introduced to and stored in the compressed gas storage unit 110 during off-peak hours. The pressure of the compressed process gas in the compressed gas storage unit may be from a low of about 3.4 MPa (500 psia), about 4.1 MPa (600 psia), or about 4.8 MPa (700 psia) to a high of about 6.2 MPa (900 psia), about 6.9 MPa (1000 psia), about 7.6 MPa (1100 psia), or greater. The temperature of the compressed process gas in the compressed gas storage unit may be from a low of about 15.6° C. (60° F.), about 21.1° C. (70° F.), about 26.7° C. (80° F.), or about 29.4° C. (85° F.) to a high of about 35° C. (95° F.), about 37.8° C. (100° F.), about 43.3° C. (110° F.), about 48.9° C. (120° F.), or greater. For example, the process gas in line 102 may have a pressure of about 5.5 MPa (800 psia) and a temperature of about 32.2° C. (90° F.).

During peak hours, the compressed process gas may be released from the compressed gas storage unit 110 and directed to the expansion assembly 130 to generate a power output. Prior to being introduced to the expansion assembly 130, the compressed process gas may be heated via the process gas heating cycle. In the process gas heating cycle, the compressed process gas may be directed to the first recuperator 123 of the heat recovery unit 120 via the feed line 115. The first recuperator 123 may transfer heat from the exhaust product from the combustion turbine assembly 150 and/or the duct burner 122 to the compressed process gas to preheat the compressed process gas. The first recuperator 123 may preheat the compressed process gas to a temperature from a low of about 65.6° C. (150° F.), about 93.3° C. (200° F.), about 121.1° C. (250° F.), or about 148.9° C. (300° F.) to a high of about 176.7° C. (350° F.), about 204.4° C. (400° F.), about 232.2° C. (450° F.), about 260° C. (500° F.), or greater.

In the process gas heating cycle, the compressed process gas from the first recuperator 123 may be directed to the second recuperator 124 for subsequent heating via line 116. The second recuperator 124 may receive the preheated compressed process gas and transfer heat from the exhaust product of the combustion turbine assembly 150 and/or the duct burner 122 to the preheated compressed process gas. The second recuperator 124 may heat the preheated compressed process gas to a temperature from a low of about 399° C. (750° F.), about 426.7° C. (800° F.), about 454.4° C. (850° F.), or about 482.2° C. (900° F.) to a high of about 537.8° C. (1000° F.), about 535.6° C. (1050° F.), about 593.3° C. (1100° F.), about 621.1° C. (1150° F.), or greater.

The heated compressed process gas from the second recuperator 124 may be directed to the expansion assembly 130 via line 118. The heated compressed process gas from the second recuperator 124 may have a pressure from a low of about 3.4 MPa (500 psia), about 4.1 MPa (600 psia), or about 4.8 MPa (700 psia) to a high of about 6.2 MPa (900 psia), about 6.9 MPa (1000 psia), about 7.9 MPa (1100 psia), or greater. For example, the pressure of the heated compressed process gas from the second recuperator 124 may be about 5.2 MPa (750 psia). The heated compressed process gas may be expanded in the turbine 132 to generate a power output in the generator 134. In at least one embodiment, the expansion of the process gas in the turbine 132 of the expansion assembly 130 may provide about 5 MW of energy or greater in the generator 134. The expanded process gas may be exhausted to the atmosphere or directed to another system or assembly of the CAES system 100. For example, the expanded process gas may be introduced to the combustor 158 of the combustion turbine assembly 150 via line 160.

As previously discussed, the heat recovery unit 120 may be configured to provide steam or water vapor via the steam production cycle. The steam production cycle may include introducing feed water from the water source 140 to the heat recovery steam generator 125 of the heat recovery unit 120 via line 142 to produce steam for injection into one or more systems or assemblies of the CAES system 100. The feed water introduced to the heat recovery steam generator 125 may be at a pressure from a low of about 1 MPa (150 psia), about 1.4 MPa (200 psia), or about 1.7 MPa (250 psia) to a high of about 2 MPa (300 psia), about 2.4 MPa (350 psia), about 2.8 MPa (400 psia), or greater. The feed water introduced to the heat recovery steam generator 125 may have a temperature from a low of about 4.4° C. (40° F.), about 10° C. (50° F.), or about 15.6° C. (60° F.) to a high of about 21.1° C. (70° F.), about 26.7° C. (80° F.), about 32.2° C. (90° F.), or greater. For example, the feed water introduced to the heat recovery steam generator 125 may have a pressure of about 2 MPa (290 psia) and a temperature of about 15.6° C. (60° F.).

The heat recovery steam generator 125 may transfer heat or thermal energy to the feed water to vaporize the feed water to steam or water vapor. The steam may be directed to the combustion turbine assembly 150 via line 144. The steam directed to the combustion turbine assembly 150 may have a pressure from a low of about 1 MPa (150 psia), about 1.4 MPa (200 psia), or about 1.7 MPa (250 psia) to a high of about 2 MPa (300 psia), about 2.4 MPa (350 psia), about 2.8 MPa (400 psia), or greater. The steam directed to the combustion turbine assembly 150 may have a temperature from a low of about 260° C. (500° F.), about 287.8° C. (550° F.), or about 315.6° C. (600° F.) to a high of about 343.3° C. (650° F.), about 371.1° C. (700° F.), about 398.9° C. (750° F.), or greater. For example, the steam directed to the combustion turbine assembly 150 may have a pressure of about 1.9 MPa (280 psia) and a temperature of about 343.3° C. (650° F.).

The steam in line 144 may be directed to the combustor 158 of the combustion turbine assembly 150 and may be mixed with the fuel from line 157 and the compressed process gas from the compressor 152 of the combustion turbine assembly 150. The combustor 158 may combust or burn the mixture of the fuel, the compressed process gas, and the steam to provide a combustion product and direct the combustion product to the turbine 154. The turbine 154 may expand the combustion product to provide the exhaust product, which may be exhausted to the heat recovery unit 120 via line 117 to provide heat or thermal energy thereto before being exhausted via the stack 126. The exhaust product directed to the heat recovery unit 120 may have a temperature from a low of about 426.7° C. (800° F.), about 482.2° C. (900° F.), or about 537.8° C. (1000° F.) to a high of about 593.3° C. (1100° F.), about 648.9° C. (1200° F.), or about 704.4 (1300° F.).

The duct burner 120 of the heat recovery unit 120 may receive the exhaust product from the combustion turbine assembly 150 and may further heat the exhaust product by transferring heat from a heat source introduced thereto via line 121. In at least one embodiment, the duct burner 122 may heat the exhaust product to a temperature from a low of about 537.8° C. (1000° F.), about 593.3° C. (1100° F.), about 648.9° C. (1200° F.), or about 676.7° C. (1250° F.) to a high of about 732.2° C. (1350° F.), about 760° C. (1400° F.), about 815.6° C. (1500° F.), about 871.1° C. (1600° F.), or greater. In at least one embodiment, the turbine 132 of the expansion assembly 130 may have a design inlet temperature greater than the temperature of the exhaust product from the combustion turbine assembly 150. Accordingly, the duct burner 122 may provide supplemental heat or thermal energy to the heat recovery unit 120 to increase the temperature of the exhaust product from the combustion turbine assembly 150. The supplemental heat from the duct burner 122 may be provided to sufficiently heat the compressed process gas in the recuperators 123, 124 to a temperature at or near the design inlet temperature of the turbine 132 of the expansion assembly 130.

Figure 3:
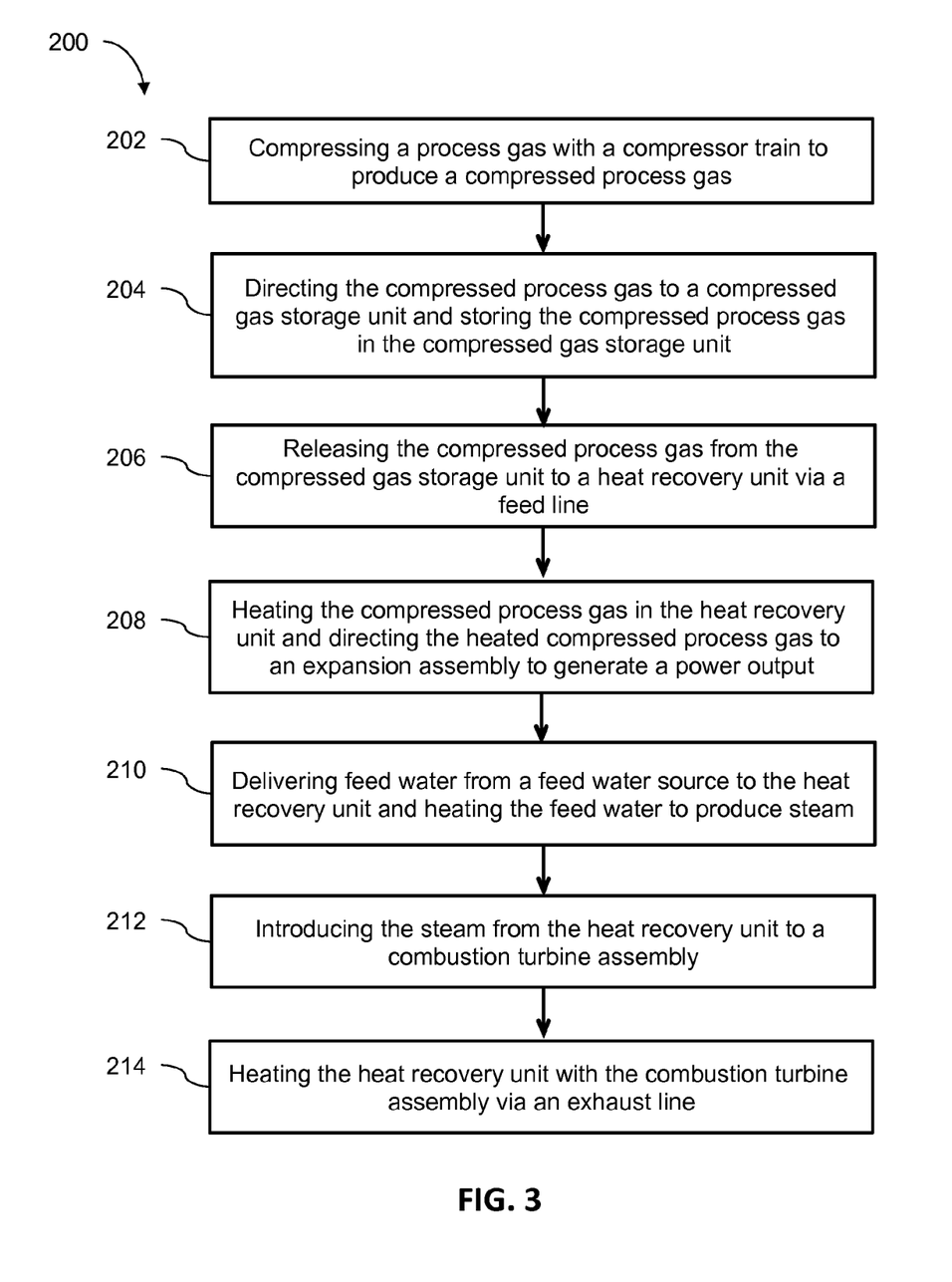
FIG. 3 illustrates a flowchart of an illustrative method of operating the CAES system including a steam production cycle, according to one or more embodiments disclosed herein.

FIG. 3 illustrates a flowchart of an illustrative method 200 of operating the CAES system including a steam production cycle, according to one or more embodiments disclosed. The method 200 may include compressing a process gas with a compressor train to produce a compressed process gas, as shown at 202. The method 200 may also include directing the compressed process gas to a compressed gas storage unit and storing the compressed process gas in the compressed gas storage unit, as shown at 204. The method 200 may further include releasing the compressed process gas from the compressed gas storage unit to a heat recovery unit via a feed line, as shown at 206. The method 200 may also include heating the compressed process gas in the heat recovery unit and directing the heated compressed process gas to an expansion assembly to generate a power output, as shown at 208. The method 200 may also include delivering feed water from a feed water source to the heat recovery unit and heating the feed water to produce steam, as shown at 210. The method 200 may further include introducing the steam from the heat recovery unit to a combustion turbine assembly, as shown at 212. The method 200 may also include heating the heat recovery unit with the combustion turbine assembly via an exhaust line, as shown at 214.

Figure 4:
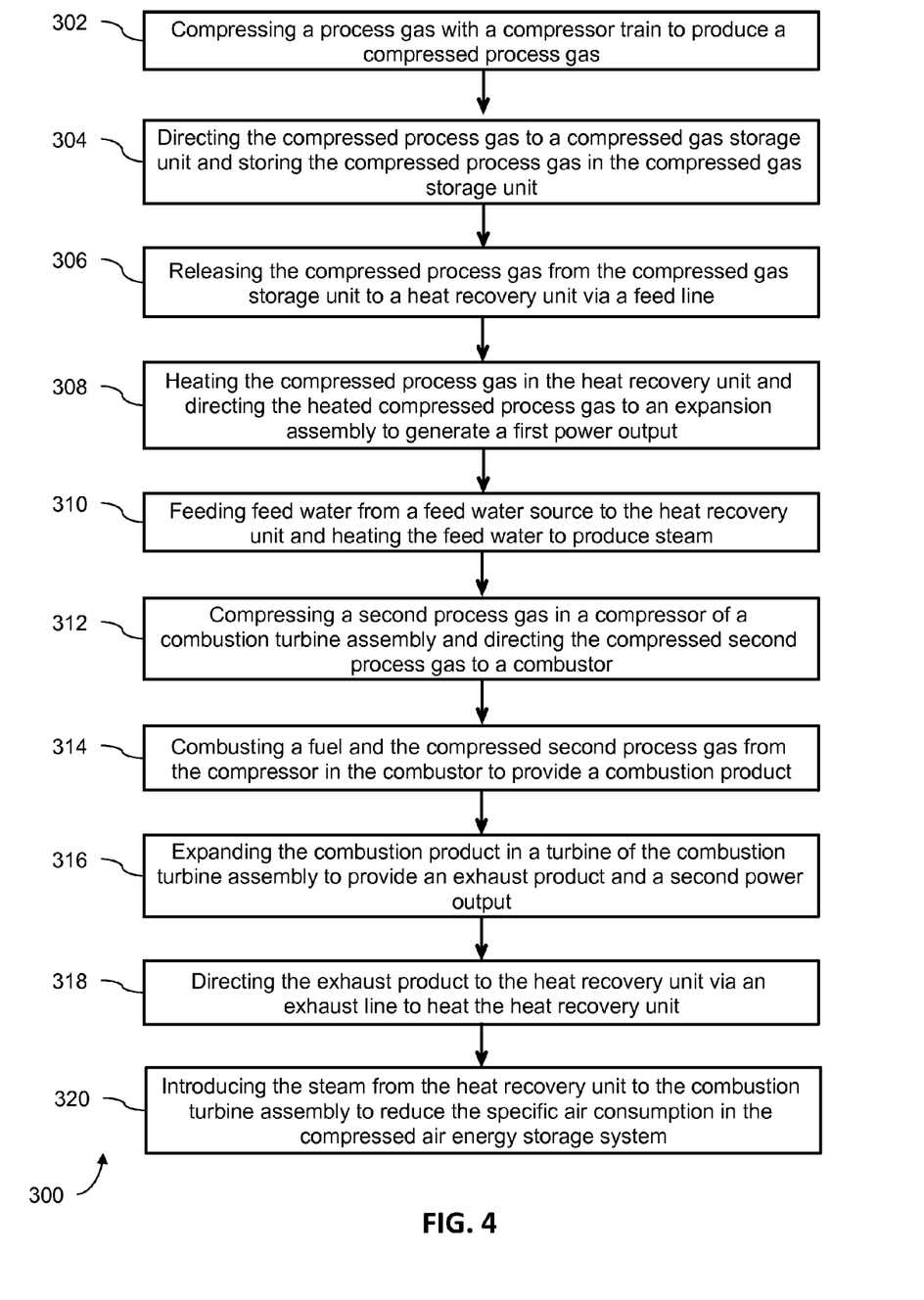
FIG. 4 illustrates a flowchart of an illustrative method of reducing specific air consumption in the CAES system including the steam production cycle, according to one or more embodiments disclosed herein.

FIG. 4 illustrates a flowchart of an illustrative method 300 of reducing specific air consumption in the CAES system including the steam production cycle, according to one or more embodiments disclosed. The method 300 may include compressing a process gas with a compressor train to produce a compressed process gas, as shown at 302. The method 300 may also include directing the compressed process gas to a compressed gas storage unit and storing the compressed process gas in the compressed gas storage unit, as shown at 304. The method 300 may also include releasing the compressed process gas from the compressed gas storage unit to a heat recovery unit via a feed line, as shown at 306. The method 300 may also include heating the compressed process gas in the heat recovery unit and directing the heated compressed process gas to an expansion assembly to generate a first power output, as shown at 308. The method 300 may also include feeding feed water from a feed water source to the heat recovery unit and heating the feed water to produce steam, as shown at 310. The method 300 may also include, compressing a second process gas in a compressor of a combustion turbine assembly and directing the compressed second process gas to a combustor, as shown at 312. The method 300 may also include combusting a fuel and the compressed second process gas from the compressor in the combustor to provide a combustion product, as shown at 314. The method 300 may also include expanding the combustion product in a turbine of the combustion turbine assembly to provide an exhaust product and a second power output, as shown at 316. The method 300 may also include directing the exhaust product to the heat recovery unit via an exhaust line to heat the heat recovery unit, as shown at 318. The method 300 may also include introducing the steam from the heat recovery unit to the combustion turbine assembly to reduce the specific air consumption in the compressed air energy storage system, as shown at 320.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A method for operating a compressed air energy storage system, comprising:
   compressing a process gas with a compressor train to produce a compressed process gas;
   directing the compressed process gas to a compressed gas storage unit and storing the compressed process gas in the compressed gas storage unit;
   releasing the compressed process gas from the compressed gas storage unit to a heat recovery unit via a feed line;
   heating the compressed process gas in the heat recovery unit and directing the heated compressed process gas to an expansion assembly to generate a power output;
   feeding feed water from a feed water source to the heat recovery unit and heating the feed water to produce steam;
   introducing the steam from the heat recovery unit to a combustion turbine assembly; and
   heating the heat recovery unit with the combustion turbine assembly via an exhaust line.

2. The method of claim 1, further comprising:
   expanding the heated compressed process gas in a turbine of the expansion assembly to produce mechanical energy; and
   driving a generator of the expansion assembly with the mechanical energy to generate the power output.

3. The method of claim 1, further comprising:
expanding the heated compressed process gas from the heat recovery unit via a turbine of the expansion assembly to provide an expanded process gas and the power output; and
directing the expanded process gas to a compressor of the combustion turbine assembly.

4. The method of claim 1, wherein compressing the process gas with the compressor train to produce the compressed process gas further comprises generating heat from the compression of the process gas, and absorbing at least a portion of the heat from the compressed process gas with a cooler.

5. The method of claim 1, wherein the steam provided by the heat recovery unit does not combine with the compressed process gas from the compressed gas storage unit.

6. The method of claim 1, wherein the heat recovery unit comprises a duct burner, one or more recuperators, and a heat recovery steam generator, each coupled with and in thermal communication with the exhaust line.

7. The method of claim 6, further comprising:
directing the compressed process gas from the compressed gas storage unit to a first recuperator of the heat recovery unit;
transferring heat from the exhaust line to the compressed process gas in the first recuperator to preheat the compressed process gas; and
directing the preheated compressed process gas to a second recuperator for further heating before directing the heated compressed process gas to the expansion assembly.

8. The method of claim 1, further comprising:
delivering a fuel to a combustor of the combustion turbine assembly;
compressing a second process gas in a compressor of the combustion turbine assembly and directing the compressed second process gas to the combustor;
combusting the fuel and the compressed second process gas from the compressor in the combustor to provide a combustion product;
expanding the combustion product in a turbine of the combustion turbine assembly to provide an exhaust product and a second power output; and
directing the exhaust product to the heat recovery unit via the exhaust line to heat the heat recovery unit.

9. The method of claim 8, further comprising:
introducing the steam from the heat recovery unit to the combustion turbine assembly upstream of the combustor; and
combusting the steam with the fuel and the compressed process gas in the combustor.

10. The method of claim 8, further comprising:
introducing the steam from the heat recovery unit directly to the combustor; and
combusting the steam with the fuel and the compressed process gas in the combustor.

11. A compressed air energy storage system, comprising:
a compressor train configured to receive a process gas and output a compressed process gas;
a compressed gas storage unit fluidly coupled with the compressor train and configured to receive, store, and output the compressed process gas;
a heat recovery unit fluidly coupled with the compressed gas storage unit via a feed line and configured to receive the compressed process gas from the compressed gas storage unit and heat the compressed process gas, and further configured to receive feed water from a feed water source and heat the feed water to provide steam;
a combustion turbine assembly fluidly coupled with the heat recovery unit and configured to receive the steam from the heat recovery unit and deliver heat to the heat recovery unit via an exhaust line; and
an expansion assembly fluidly coupled with the heat recovery unit and configured to receive the heated compressed process gas from the heat recovery unit and generate a power output.

12. The system of claim 11, wherein the heat recovery unit comprises:
a duct burner coupled with and in thermal communication with the exhaust line,
a first recuperator and a second recuperator coupled with and in thermal communication with the exhaust line downstream from the duct burner, and
a heat recovery steam generator coupled with and in thermal communication with the exhaust line between the first and second recuperators.

13. The system of claim 11, wherein the heat recovery unit is a single-body assembly.

* * * * *